(12) United States Patent
Lesieur

(10) Patent No.: US 6,797,244 B1
(45) Date of Patent: Sep. 28, 2004

(54) COMPACT LIGHT WEIGHT AUTOTHERMAL REFORMER ASSEMBLY

(75) Inventor: Roger R. Lesieur, Enfield, CT (US)

(73) Assignee: DTC Fuel Cells LLC, Windsor, CT (US)

(*) Notice: Subject to any disclaimer, the term of this patent is extended or adjusted under 35 U.S.C. 154(b) by 362 days.

(21) Appl. No.: 09/321,390

(22) Filed: May 27, 1999

(51) Int. Cl.[7] ................................................. B01J 8/02
(52) U.S. Cl. ........................ 422/222; 422/177; 422/180; 422/190; 422/211; 165/DIG. 395; 165/DIG. 396; 165/DIG. 397
(58) Field of Search ............................. 165/DIG. 395, 165/DIG. 396, DIG. 397; 422/122, 177, 179, 180, 181, 190, 211, 218, 222

(56) References Cited

U.S. PATENT DOCUMENTS

| | | | | |
|---|---|---|---|---|
| 4,027,476 A | * | 6/1977 | Schmidt | 60/218 |
| 4,308,233 A | * | 12/1981 | Narumiya et al. | 422/169 |
| 4,414,140 A | * | 11/1983 | Setzer | 502/303 |
| 4,415,484 A | * | 11/1983 | Setzer et al. | 502/332 |
| 4,451,578 A | * | 5/1984 | Setzer et al. | 502/303 |
| 4,503,029 A | * | 3/1985 | Setzer | 423/652 |
| 4,693,882 A | * | 9/1987 | Setzer et al. | 423/652 |
| 4,755,498 A | * | 7/1988 | Setzer et al. | 502/303 |
| 4,781,241 A | * | 11/1988 | Misage et al. | 165/140 |
| 5,110,780 A | * | 5/1992 | Peters | 502/303 |
| 5,384,099 A | * | 1/1995 | Sheller | 422/174 |
| 5,498,370 A | * | 3/1996 | Bhattacharyya et al. | 252/373 |
| 5,733,347 A | * | 3/1998 | Lesieur | 48/61 |
| 5,769,909 A | * | 6/1998 | Bonk et al. | 48/127.9 |
| 5,853,674 A | * | 12/1998 | Lesieur | 422/173 |

FOREIGN PATENT DOCUMENTS

| | | |
|---|---|---|
| EP | 0 913 357 A1 | 5/1999 |
| WO | 98/08771 | * 3/1998 |

* cited by examiner

Primary Examiner—Jerry D. Johnson
(74) Attorney, Agent, or Firm—William W. Jongs

(57) ABSTRACT

A fuel gas-steam reformer assembly, preferably an autothermal reformer assembly, for use in a fuel cell power plant, includes a catalyst bed which is formed from a cylindrical monolithic open cell foam body. The foam body is preferably formed from a high temperature material such as stainless steel, nickel alloys and iron-aluminum alloys, or from a ceramic material. The foam body includes open cells or pores which are contained within the metal or ceramic lattice. The lattice is coated with a porous wash coat which serves as a high surface area substrate onto which catalysts used in the reformer are applied. The foam body has an inlet end into which a mixture of fuel, steam and air is fed to begin the reforming process. An inlet portion of the foam body may be provided with an iron oxide and/or noble metal catalyst and the remainder of the foam body may be provided with a nickel and/or noble metal catalyst. An advantage of including an autothermal reformer in a fuel processing system is the compactness of the autothermal reformer. The inclusion of the foam catalyst bed rather than the traditional catalyzed pellet bed allows the reformer to be made even more compact and light weight.

3 Claims, 3 Drawing Sheets

COMPACT LIGHT WEIGHT AUTOTHERMAL REFORMER ASSEMBLY

TECHNICAL FIELD

This invention relates to a fuel gas steam reformer assembly. More particularly, this invention relates to an autothermal fuel gas steam reformer assembly which employs an open cell foam catalyst bed that reduces the size and weight of the reformer, assembly.

BACKGROUND ART

Fuel cell power plants include fuel gas steam reformers which are operable to catalytically convert a fuel gas, such as natural gas or heavier hydrocarbons, into the primary constituents of hydrogen and carbon dioxide. The conversion involves passing a mixture of the fuel gas and steam through a catalytic bed which is heated to a reforming temperature which varies depending upon the fuel being reformed. Catalysts typically used are nickel catalysts which are deposited on alumina pellets. There are three types of reformers most commonly used for providing a hydrogen-rich gas stream to fuel cell power plants. These are a catalytic steam reformer, an autothermal reformer, and a catalyzed wall reformer. In addition, hydrocarbon fuels a may be converted a hydrogen-rich gas stream by use of a partial oxidation reaction apparatus. A typical catalytic steam reformer will consist of a plurality of reaction tubes which are contained in a housing that is insulated for heat retention. The reaction tubes are heated by burning excess fuel gas in the housing and passing the burner gas over the reaction tubes. The reforming temperature is in the range of about 700° F. to about 1,600° F. The individual reaction tubes will typically include a central exhaust passage surrounded by an annular entry passage. The entry passage is filled with the catalyzed alumina pellets, and a fuel gas-steam manifold is operable to deliver the fuel gas-steam mixture to the bottom of each of the entry passages whereupon the fuel gas-steam mixture flows through the catalyst beds. The resultant heated mixture of mostly hydrogen and carbon dioxide gas then flows through the central exhaust passages in each tube so as to assist in heating the inner portions of each of the annular catalyst beds; and thence from the reformer for further processing and utilization. Such catalytic steam reformers are described in U.S. Pat. No. 4,098,587.

A typical autothermal reformer may-be a single bed or a multiple bed tubular assembly. Autothermal reformers are often used when higher operation temperatures are required for the reforming process because the fuel to be processed is more difficult to reform. In an autothermal reformer, the reaction gasses are heated by burning excess fuel within the reaction bed by adding air to the fuel and steam mixture so that the remaining fuel-steam mixture is increased to the temperature necessary for the fuel processing reaction. Typically, wall temperatures in an autothermal reformer are in the range of about 1,400° F. to about 1,800° F. Such reformers are described in U.S. Pat. No. 4,473,543.

A third type of prior art reformers have utilized catalyzed wall passages such as described in U.S. Pat. No. 5,733,347. Such reformers are formed from a sandwich of essentially flat plates with intervening corrugated plates which form reformer gas passages and adjacent regenerator-heat exchanger passages. Each of the reformer passage plate units is disposed directly adjacent to a burner passage plate unit so that the adjacent reformer and burner passages share a common wall.

Besides the reformer devices described above, a partial oxidation reaction apparatus may also be used to produce a hydrogen-rich fuel stream. This device is typically a chamber that is led a hydrocarbon fuel, steam and oxidant source, usually air, so that the mixture spontaneously partially oxidizes to form a hydrogen-rich mixture. Such devices, for example, are disclosed in PCT application WO 98/08771.

U.S. Pat. No. 4,451,578, granted May 29,1984 contains a discussion of autothermal reforming assemblages, and is incorporated herein in its entirety. The autothermal reformer assembly described in the '578 patent utilizes catalyzed alumina pellets. Although autothermal reformers allow a degree of system compaction, it would be desirable to further decrease the size and weight of an autothermal reformer, and also of any tubular reformer, particularly in systems which are utilized in vehicular applications. Attempts have been made to decrease the size and weight of autothermal and other tubular, reformers through the use of specially configured catalyst pellets. Such specialized pellet configurations include rings, flat pellets with holes, wagon wheel-shaped pellets, and lobed pellets, for example.

It would be desirable to provide an autothermal reformer assembly which does not require the use of specially configured catalyzed alumina pellets, and which is more compact and light weight than the prior art autothermal reformer assemblies which do utilize catalyzed alumina pellets. Such reformer assemblies would find particular utility in vehicular applications.

DISCLOSURE OF THE INVENTION

This invention relates to a fuel cell system autothermal reformer assembly which provides an enhanced catalyst and heat transfer surface area; is compact and light weight; and provides an enhanced gas mixing and distribution flow path. The catalyst bed structure of this invention is formed from a monolithic open cell foam core which is provided with a porous high surface area wash coat layer onto which the catalyst layer is deposited. Cells in the open cell foam onto which a catalyst is deposited are occasionally referred to herein as "catalyzed cells". The wash coat may be alumina, lanthanum-stabilized alumina, silica-alumina, silica, ceria, silicon carbide, or another high surface ceramic material. The choice of wash coat will depend on the operating parameters of the specific catalyst bed.

The monolithic gas flow component is a foam with interconnected open cells, the surfaces of which are catalyzed with a catalyst. The foam monolith has an entry end portion which is coated with a catalyst consisting of lanthanum-promoted alumina, calcium oxide, and an iron oxide catalyst which can also be treated with a small amount of platinum, palladium or rhodium for improved low temperature fuel gas ignition. As an alternative configuration, the entry end may include a catalyst of platinum, palladium or rhodium without the iron oxide catalyst. The remainder of the foam monolith is provided with a nickel, copper or zinc catalyst, or with such noble metal catalysts such as platinum, palladium, rhodium, or the like. The open cell foam, once wash coated, provides the high surface area base required in order to achieve the deposition of the high surface area catalysts needed to properly process the fuel gas. The open cell foam also provides an enhanced mixing and distribution gas flow pattern for gases passing through the monolith since the gases will flow both laterally and longitudinally through the structure. The open cell foam also provides high surface area heat transfer paths that contribute to a more turbulent gas flow that enhances heat transfer rates in systems utilizing the catalyst bed. Additionally, the high heat transfer provided by the foam can be continued into and through adjacent walls of the reactor so as to create a highly efficient heat transfer device that results in improved process temperature control and reduces the size and weight of the reformer for a given output level. The intervening walls may be flat plates or they may be cylindrical walls with heat transfer capabilities. The monolithic open cell foam catalyst bed may be bonded to the reformer catalyst bed walls by brazing, or any other appropriate mechanism which is suitable for the system in question. When a ceramic foam catalyst bed is employed, the catalyst bed will not likely be bonded to the reformer bed walls.

All surfaces to be catalyzed will be primed by means of a conventional wash coating process such as that provided by United Catalyst, W. R. Grace and Co., or Englehard Corp. The wash coating process produces a porous layer on all surfaces of the foam, which layer forms a base for the catalyst coating. It will be understood that the interstices as well as the outside surfaces of the open cell foam monolith are wash coated and are also catalyzed. Since the catalyst beds are of minimal size and weight, they are especially suited to vehicular applications where size and weight are critically important, and because vehicle applications require rapid start-up capability that is closely dependent on the size and weight of the components. Small, light weight catalyst and reactant beds can be rapidly heated with a minimum energy input.

In its preferred embodiment, the autothermal reformer assemblage is generally cylindrical in configuration, and includes several concentric chambers formed from cylindrical housing walls. The outermost chamber is annular and contains helical fuel/steam, and/or air flow conduits. In an alternate configuration, the outermost conduit could contain a steam/air mixture with the fuel being injected into the steam/air mixture just prior to entry into the entry portion of the catalyst bed. A central gas flow chamber is cylindrical and contains a monolithic open cell foam catalyst bed through which the fuel, steam and air gas streams flow. The catalyst bed has two different catalyzed zones, one of which is an inlet zone for carbon-free combustion of a small amount of the fuel gas and for autothermal reforming of the fuel gas, and the other of which is an adiabatic reforming zone. An intermediate annular gas flow chamber is interposed between the inner gas flow chamber and the outermost chamber and serves to channel the reformed gas stream which issues from the central chamber to the outermost chamber.

Heat is generated internally in the reformer catalyst bed due to the addition of air to the process gas stream, which is a fuel/steam mixture. Thus there is no need to spread the reforming catalyst along large heat transfer surfaces as is required with a conventional steam reformer. The use of an open cell foam monolith as the catalyst support bed can increase the catalyzed surface area of the support bed by a factor of at least three, depending on the pore size of the foam catalyst support bed. Use of the foam support bed can also reduce the volume of the bed by a factor of at least three, and can reduce the weight of the bed by an even greater factor, as compared to a pelletized catalyst bed. The foam catalyst support bed can provide greater than an 80% open volume while a pelletized bed provides about a 40% open volume. The increased open volume results in a much lower pressure drop across the catalyst bed than can be achieved with a pelletized bed.

Start-up of the reformer can be achieved by either preheating the bed with a hot gas, such as steam, or by fabricating either the entire monolith or just the inlet section with a conductive resistance monolith element. The resistance element can be connected to an electrical source such as a car battery which will enable the monolith to reach operating temperatures within less than twenty seconds.

An example of the benefits of the foamed catalyst support is that, for an equivalent catalyzed surface area, a pelletized autothermal catalyst bed has a volume of 0.25 $ft^3$, weighs about twenty five pounds; while a foam support bed having a twenty pore/finch pore size can be formed with a volume of 0.07 $ft^3$, and weighs less than four pounds. In cases wherein a higher pressure drop can be tolerated, a 30 to 40 pore/finch foam can be used to provide an even smaller and lighter bed. Such small and light weight to fuel processors can be heated quickly using electricity from an automobile battery, and thus are particularly desirable for vehicular applications.

In a preferred embodiment of the invention, the catalyst bed will be formed from a ceramic foam that will be wash coated with alumina, calcium aluminate or lanthanum-promoted alumina, whereafter the wash coat will be impregnated with a proper catalyst. The inlet section of the catalyst bed will be provided with an iron oxide catalyst which limits carbon deposition and is, at the same time operable to raise the temperature of the incoming gas stream without requiring large amounts of oxygen as described in U.S. Pat. No. 4,451,578. The iron catalyst may be promoted with a small quantity of platinum, palladium or rhodium so as to provide a lower ignition temperature of the fuel gas fraction that is combusted in the reformer during operation of the reformer. In the case of an autothermal reformer with a conventional catalyst that includes iron oxide as described in U.S. Pat. No. 4,451,578, the expected ignition temperature of the fuel is in the 1,000 to 1,300° F. range. However, it has been found that with the addition of a small amount of a noble metal catalyst such as platinum, palladium or rhodium to the iron oxide, the ignition temperature can be lowered to about 500° F. The metal catalyst addition is in the range of about 0.01% up to about 1.0% by weight. Typically, the amount added is about 0.1%. The achievement of a lower ignition temperature enables a quicker start-up of the reformer which is particularly desirable in vehicular applications of the system. The iron oxide in the catalyst could be replaced by platinum, palladium or rhodium as described in U.S. Pat. No. 4,415,484.

The inlet portion of the catalyst bed is operable to burn oxygen and a minor amount of the fuel gas so as to raise the temperature of the inlet portion of the catalyst bed. This raises the temperature of the gas stream to temperatures which provide enhanced conversion of the fuel stream to a high hydrogen-content gas. Minimal oxygen requirements serve to inhibit carbon formation in the catalyst bed. Other carbon formation-suppressing catalyst bed components such as calcium oxide, lanthanum oxide, and/or cerium oxide, for example, could also be used. The subsequent reforming section of the catalyst bed is provided with a conventional nickel or noble metal reforming catalyst, or a combination of a nickel reforming catalyst, and a noble metal reforming catalyst.

It is therefore an object of this invention to provide an improved autothermal fuel gas processing assembly which includes a catalyst bed that is compact and light weight.

It is a further object of this invention to provide a fuel gas processing assembly of the character described which is sufficiently compact and light weight so as to be useful in a vehicular application.

It is another object of this invention to provide a fuel gas processing assembly of the character described which can be quickly brought up to operating temperatures through the use of electricity provided by an automotive battery.

It is yet another object of this invention to provide a fuel gas processing assembly of the character described which has a lowered fuel ignition temperature to allow rapid start up.

BRIEF DESCRIPTION OF THE DRAWINGS

These and other objects and advantages of this invention will become readily apparent to one skilled in the art from the following detailed description of a preferred embodiment of the invention when taken in conjunction with the accompanying drawings in which.

SPECIFIC MODE FOR CARRYING OUT THE INVENTION

Figure 1:
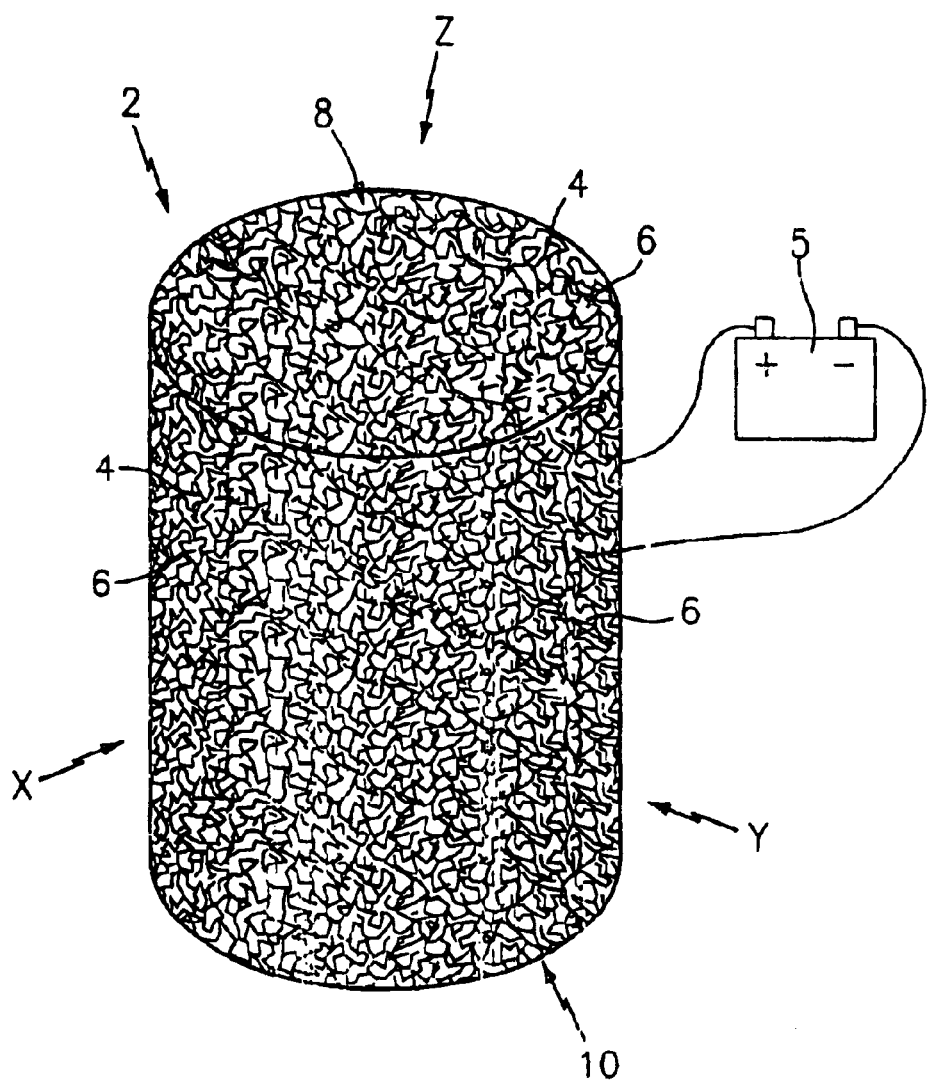
FIG. 1 is a perspective view of a preferred form of an open cell monolithic foam catalyst bed which is adapted for use in an autothermal or tubular reformer assembly formed in accordance with this invention.

Referring now to the drawings, there is shown in FIG. 1 a perspective view of a cylindrical form of a catalyst bed formed in accordance with this invention, which bed is denoted generally by the numeral 2. The catalyst bed 2 is a monolithic open cell foam component which includes a lattice network of tendrils 4 which form a network of open cells 6 which are interconnected in the X, Y and Z directions within the bed 2. It will be appreciated that the catalyst bed 2 can be formed from a single monolith or from a plurality of thinner monoliths stacked one atop the other. The latter approach could simplify the differential catalyzation of the bed 2, and could also reduce thermal stresses imparted to the bed 2 during operation of the reformer. The interconnected open cells 6 are operable to form an enhanced fuel gas mixing and distribution flow path from end 8 to end 10 of the bed 2. The open cells 6 and the tendrils 4 also provide a very large catalyzable surface area in the bed 2. The foam catalyst bed 2 can be formed from aluminum, stainless steel, an aluminum-steel alloy, silicon carbide, nickel alloys, carbon, graphite, a ceramic, or the like material. The monolith 2 can be connected to an electrical source 3 such as battery 5 which will enable the monolith to reach operating temperatures within less than about twenty seconds.

The bed 2 is catalyzed in the following manner. A wash coated porous alumina primer is applied to all outer and interstitial surfaces in the bed 2 which are to be catalyzed. The alumina wash coat can be applied to the bed 2 by dipping the bed 2 into a wash coat solution, or by spraying the wash coat solution onto the bed 2. The wash coated bed 2 is then heat treated so as to form the high surface area porous alumina layer on the core. The catalyst layer is then applied to the alumina surfaces of the bed. 2. It so desired, the alumina coating and catalyzing steps can be performed concurrently. Similar steps could be used for other wash coating materials.

Figure 2:
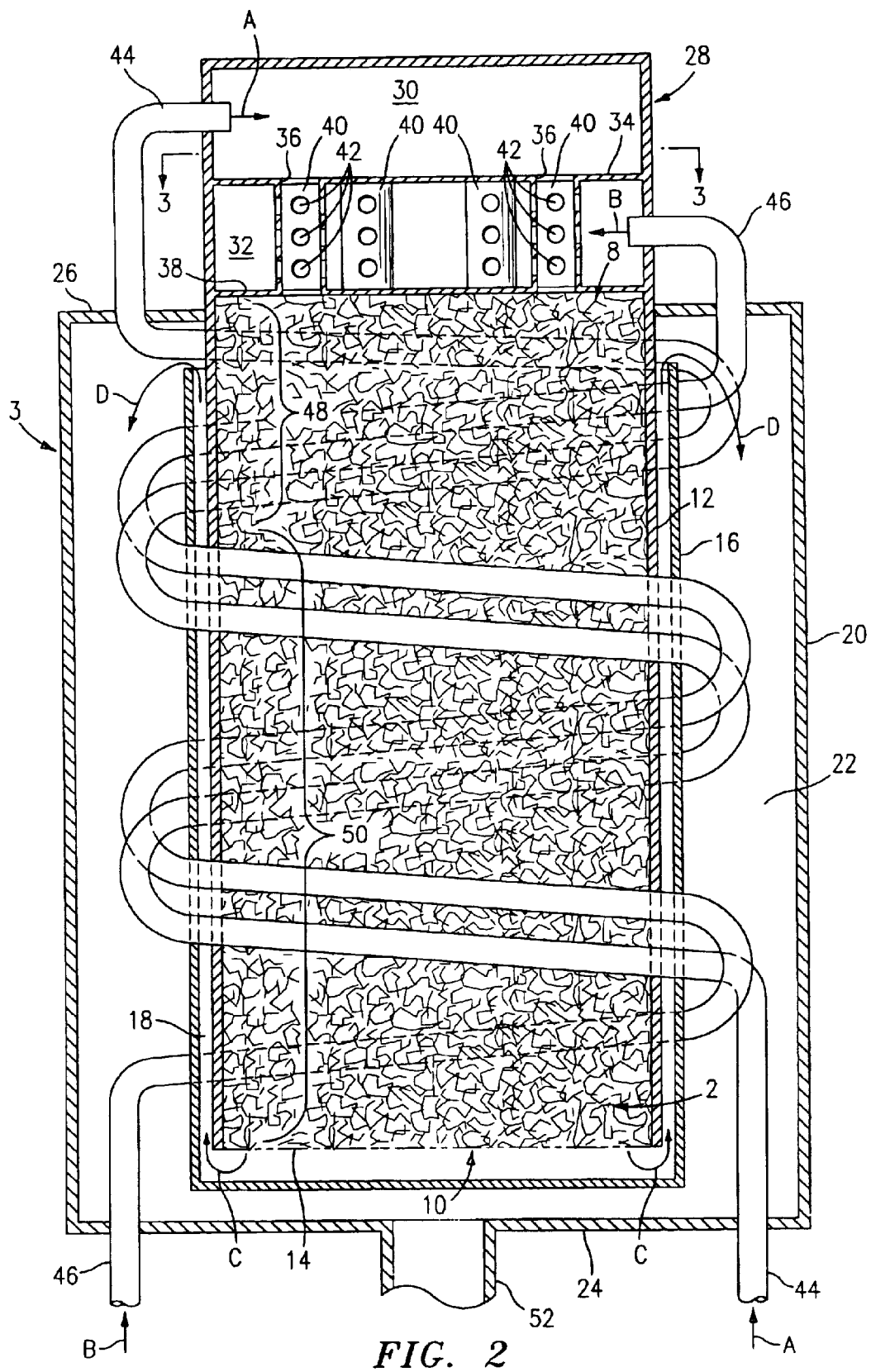
FIG. 2 is an axial cross-sectional view of an autothermal reformer assembly which is formed in accordance with this invention.

FIG. 2 is a somewhat schematic sectional view of an autothermal reformer assembly denoted generally by the numeral 3 which includes the catalyst bed 2 of FIG. 1. The catalyst bed 2 is contained in an open-ended cylindrical inner housing 12, the bottom of which contains a porous mesh screen 14 which supports the catalyst bed 2 and allows the reformed gas stream to exit from the inner housing 12. An intermediate cylindrical housing 16 surrounds the inner housing 12 and forms an inner annular gas flow path 18 for gas exiting from the catalyst bed 2. An outer cylindrical housing 20 forms the outermost wall of the reformer assembly 3. The outer cylindrical housing 20 combines with the intermediate cylindrical housing 16 to form an outer annular gas flow path chamber 22 in the assembly 3. The bottom of the assembly 3 is closed by a lower annular wall 24, and the upper end of the assembly 3 is closed by an upper annular wall 26 and a manifold 28. The inner housing 12 can be insulated to prevent heat loss to the stream in the annulus 18.

The manifold 28 includes an upper fuel/stream-inlet chamber 30 and a lower air-inlet chamber 32. The chambers 30 and 32 are separated by a plate 34 having a plurality of passages 36 formed therein. A similar plate 38 forms the lower wall of the air-inlet chamber 32. A plurality of fuel passage tubes 40 interconnect the two plates 34 and 38, the tubes 40 including perforations 42 which admit air from the chamber 32 into the gas stream flowing through the tubes 40. The air and fuel/steam streams thus intermingle in the tubes 40 before entering the inlet end 8 of the catalyst bed 2.

The fuel/steam mixture enters the reformer assembly 3 via a heat exchange tube 44, as indicated by arrow A. The temperature of the incoming fuel/steam mixture is about 450° F. The air stream enters the reformer assembly 3 via a heat exchange tube 46, as indicated by arrow B. The temperature of the entering air stream is similar to the temperature of the fuel/steam stream. The heat exchange tubes 44 and 46 can be finned tubes, or can be covered with a foam material similar to that shown in FIG. 1 above. The fins or foam are operable to enhance heat transfer to the gas streams in the tubes 44 and 46.

The heat exchange tubes 44 and 46 both spiral around the cylindrical housing 16 through the chamber 22 so that heat is transferred to the fuel/steam mixture stream and to the air stream from the reformer exhaust stream, as will be described in more detail hereinafter. Alternatively, the spiral tubes could be replaced by other heat exchanger mechanisms which are capable of transferring energy from the processed exhaust gas stream to the inlet streams. By the time that the fuel/steam mixture stream enters the inlet chamber 30, its temperature will have been raised to a temperature in the range of about 800° F. to about 1,100° F., and by the time that the air stream enters the inlet chamber 32, its temperature will have been elevated to the same temperature range. The fuel/steam mixture exits the inlet chamber 30 via the tubes 40. The air stream B enters the tubes 40 by way of the openings 42 and intermingles with the gas/steam mixture in the tubes 40. Thus, the proper admixture of air, steam and fuel will be formed in the tubes 40 and will flow therefrom into the inlet end 8 of the catalyst bed 2. The temperature of the air, steam and fuel admixture will be in the range of about 800° F. to about 1,100° F.

The catalyst bed 2 is preferably divided into different catalyst zones which include an initial inlet zone 48 and a subsequent zone 50. The inlet zone 48 is typically wash coated with alumina and then catalyzed with calcium oxide, iron oxide, and/or platinum, palladium or rhodium, so as to increase the temperature of the gas mixture to about 1,600° F. to about 1,900° F., about 1,760° F. being the preferred temperature, by combustion or partial oxidation of the in-coming fuel/steam/air mixture.

The subsequent catalyst zone 50 is provided with an underlying wash coat of alumina which is overlain by a nickel or noble metal catalyst. The catalyst zone 50 is operative to convert the fuel/steam and air mixture into a hydrogen-enriched fuel stream suitable for use in a fuel cell power plant. The core of the foam catalyst bed 2 in the zone 50 can be formed from stainless steel, an aluminum-steel alloy, silicon carbide, nickel alloys, carbon, graphite, a ceramic, or the like material. The bed 2 is catalyzed in the following manner. A wash coated porous alumina primer is applied to all outer and interstitial surfaces in the bed 2 which are to be catalyzed. The alumina wash coat can be applied to the bed 2 by dipping the bed 2 into a wash coat solution, or by spraying the wash coat solution onto the bed 2. The wash coated bed 2 is then heat treated so as to form the alumina layer on the core. The catalyst layer is then applied to the alumina surfaces of the bed 2. If so desired, the alumina coating and catalyzing steps can be performed concurrently. Similar steps could be used for other wash coating materials.

The reformed fuel stream exits from the catalyst bed 2 through the screen 14 at a temperature of about 1,100° F. to about 1,400° F. and then passes upwardly through the annulus 18 per arrows C. The exit gas from the reformer passes up through the annulus 18 in order to provide heat to the incoming fuel/steam mixture and the incoming air stream heat exchange tubes 44 and 46. The reformed gas then continues to supply heat to these tubes as it travels through the chamber 22 to the exit passage 52 as indicated by arrows D. The reformed gas stream exits assembly 3 through the passage 52 at a temperature of about 700° F. to about 1,100° F. whereupon it is further cooled and then passes to a shift converter in the fuel cell power plant assembly.

Figure 3:
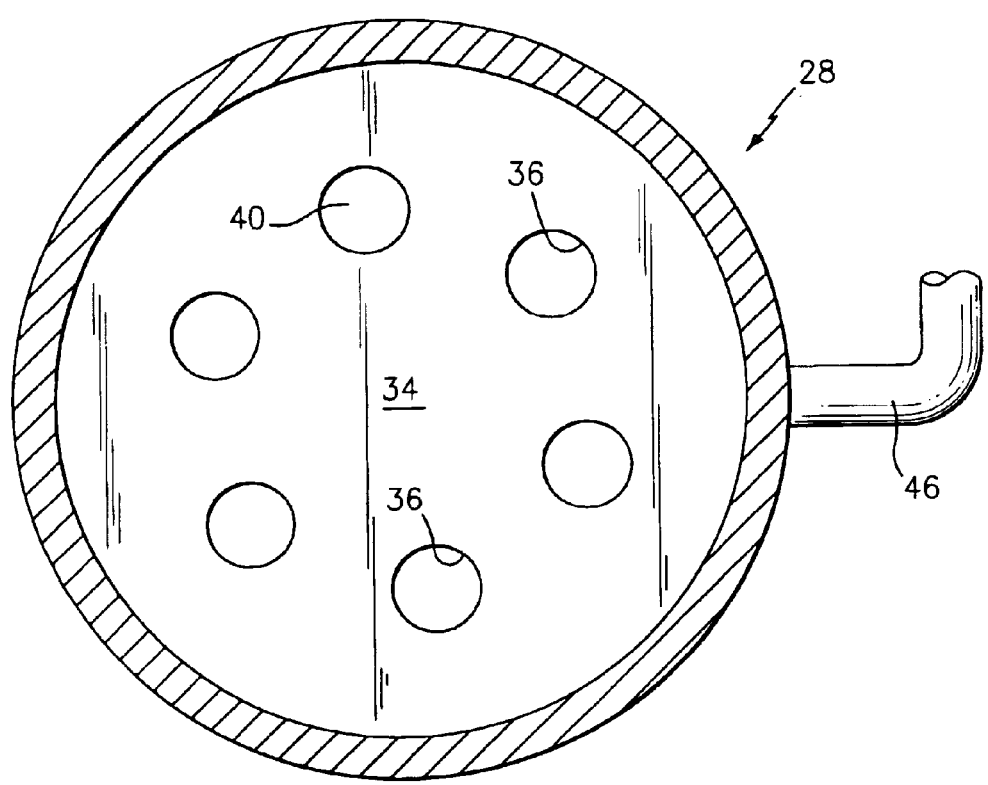
FIG. 3 is a sectional view of the reformer assembly taken along line 3–3 of FIG. 2.

As noted in FIG. 3, the fuel/steam and air transfer and mixing tubes 40 are arranged in a generally circular array through the plate 34 in the manifold 28. The number of tubes 40 can be varied as necessary, depending on the desired flow rate of the reformed fuel through the assembly 3, and the desired air-fuel-steam mixing ratios.

The open cell foam catalyst bed structure provides improved heat transfer, improved gas flow characteristics, and maximized catalyst surface area. The weight and size reductions achieved by using the catalyst bed construction of this invention are necessary for use in smaller applications such as in mobile vehicles, due to their smaller size and weight. Small size and weight also allow for rapid catalyst bed heat-up to operating temperatures which is a critical requirement for quick start capability necessary in most vehicle applications. The reduced size and weight will also benefit the packaging of stationary power plants. The catalyst bed can be formed from a single monolith core, or can be formed from a plurality of the monolith cores in the form of discs which are stacked one atop another. Monolith cores of the type described above can be obtained from Porvair Advanced Material, Inc., Hendersonville, N.C.

Since many changes and variations of the disclosed embodiment of the invention may be made without departing from the inventive concept, it is not intended to limit the invention other than as required by the appended claims.

What is claimed is:

1. A hydrocarbon fuel gas autothermal reformer assembly comprising:

a) a monolithic open cell foam catalyst bed, said foam catalyst bed including a metal support selected from the group consisting of stainless steel, nickel alloys and iron-aluminum alloys, said catalyst bed including an inlet end and an outlet end, an inlet portion of said catalyst bed being provided with a catalyst which is operable to combust a portion of the fuel gas so as to raise the temperature of said catalyst bed while inhibiting carbon deposition in catalyzed cells of said foam;

b) a fuel gas inlet passage, said fuel gas inlet passage being disposed in heat exchange relationship with a processed fuel gas stream disposed in an outlet passage from said catalyst bed whereby heat will be transferred to said fuel gas inlet passage from the processed fuel gas stream;

c) an air inlet passage, said air inlet passage being disposed in heat exchange relationship with the processed fuel gas stream whereby heat from the processed fuel gas stream will be transferred to said air inlet passage; and d) a fuel gas reforming catalyst deposited in said foam catalyst bed.

2. The autothermal reformer assembly of claim 1 wherein said metal support is connected to a source of electrical current so as to serve as a resistance heating element during start-up of said reformer assembly.

3. The autothermal reformer assembly of claim 2 wherein said metal support is electrically heated to operate temperatures within about twenty seconds after applying electrical current thereto.

* * * * *

UNITED STATES PATENT AND TRADEMARK OFFICE
CERTIFICATE OF CORRECTION

PATENT NO. : 6,797,244 B1
DATED : September 28, 2004
INVENTOR(S) : Roger R. Lesieur It is certified that error appears in the above-identified patent and that said Letters Patent is hereby corrected as shown below:

Title page,
Item [73], Assignee, "DTC" should be -- UTC --; and
Item [74], *Attorney, Agent, or Firm*, "Jongs" should be -- Jones --.

Signed and Sealed this

Twenty-fifth Day of January, 2005

JON W. DUDAS
*Director of the United States Patent and Trademark Office*